Figure 1:
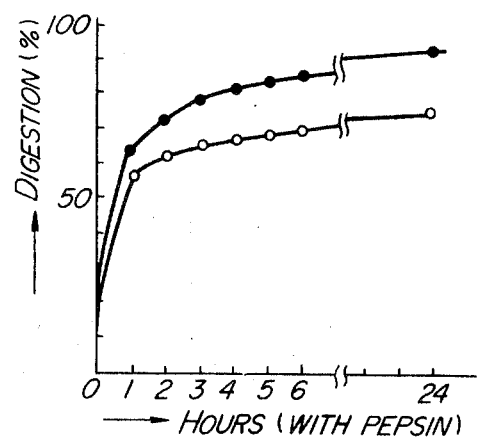

United States Patent  [11] 3,607,293

| | | | |
|---|---|---|---|
| [72] | Inventors | Tadayasu Furukawa<br>Machida-shi;<br>Hideyuki Furukawa, Tokyo, both of Japan | |
| [21] | Appl. No. | 823,613 | |
| [22] | Filed | May 12, 1969 | |
| [45] | Patented | Sept. 21, 1971 | |
| [73] | Assignee | Kyowa Hakko Kogyo Co., Ltd.<br>Tokyo, Japan | |
| [32] | Priority | May 15, 1968 | |
| [33] | | Japan | |
| [31] | | 43/32197 | |

[54] METHOD FOR TREATING MICRO-ORGANISM CELLS
18 Claims, 2 Drawing Figs.

[52] U.S. Cl. .................................................... 99/1, 99/2, 99/14
[51] Int. Cl. ...................................................... A23l 1/00
[50] Field of Search .......................................... 99/1, 2, 14, 17, 9, 96, 97

[56] References Cited
UNITED STATES PATENTS
3,288,613  11/1966  Reynolds ...................... 99/1

Primary Examiner—A. Louis Monacell
Assistant Examiner—Robert M. Elliott
Attorney—Craig, Antonelli & Hill ABSTRACT: A method for treating micro-organism cells or protein extracted therefrom in order to bleach and improve the digestion rate thereof which comprises treating the cells or extracted protein with hydrogen peroxide. Advantageously, an aqueous solution or suspension of the cells or protein is prepared, the pH is adjusted to 3–12 and about 0.1 to 10 percent by weight of hydrogen peroxide is added thereto, the temperature of the mixture being maintained at 0°–100° C.

INVENTORS
TADAYASU FURUKAWA and
HIDEYUKI FURUKAWA
BY Craig, Antonelli, Stewart & Hill
ATTORNEYS

METHOD FOR TREATING MICRO-ORGANISM CELLS

This invention relates to a method for treating micro-organism cells. More particularly, it relates to a method for treating micro-organism cells or protein extracted from micro-organism cells which is characterized by treating said cells or said extracted protein with hydrogen peroxide.

Micro-organism cells or protein extracted from cells varies in coloring and digestion rate, depending upon the particular strains, culturing conditions, the presence or absence of heat treatment and the like. These factors prevent the utilization of micro-organism cells or protein extracted from cells.

Accordingly, one of the objects of the present invention is to provide a method for treating micro-organism cells or the protein extracted therefrom which permits utilization thereof as desired.

Another object of the present invention is to provide a method for bleaching micro-organism cells or protein extracted from cells.

A further object of the invention is to provide an improvement in the digestion rate of micro-organism cells or protein extracted therefrom.

A still further object of the invention is to provide bleached micro-organism cells and extracted proteins.

These and other objects and advantages of the present invention will become apparent to those skilled in the art from a consideration of the following specification and claims.

In accordance with the present invention, an aqueous solution or suspension of micro-organism cells, such as Corynebacterium, Streptomyces and the like, or of protein extracted from said cells is allowed to react with hydrogen peroxide, thereby bleaching and simultaneously improving the digestion rate thereof. The utility of such a procedure makes it possible to provide benefits in producing feeds, foods, medicines and the like from such products.

The present invention is carried out in practice as follows. An aqueous solution or suspension of cells (living or dry) or of protein extracted from the cells is used. The cells employed are preferably those of Corynebacterium or Streptomyces. The aqueous solution or suspension is adjusted to a pH of 3–12, preferably 5–11. Hydrogen peroxide is added thereto to provide a concentration thereof of from 0.1% by weight to 10% by weight, preferably from 1% to 10% by weight. The temperature of the solution or suspension is maintained at 0°–100° C., preferably at 5°–30° C. In this manner, the suspended or dissolved cells or the protein extracted from the cells is bleached and at the same time the digestion rate thereof is improved.

If any remaining hydrogen peroxide creates some difficulty or disadvantage, it can be removed with catalase or a reducing agent.

Figure 2:
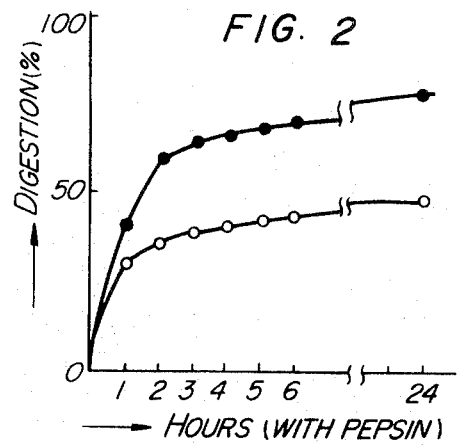

The attached drawing illustrates the advantages obtained by means of the present invention. FIG. 1 shows curves concerning the digestion rate of protein extracted from micro-organism cells with pepsin, and FIG. 2 indicates those with respect to the digestion rate of micro-organism cells with pepsin. These Figures are explained in detail in the Examples hereinbelow.

As noted above, the effect of bleaching and the improvement of digestion rate resulting from the present invention are significant. Thus, as to the effect of bleaching, the reduction ratio of coloring to that before treatment is about 70–95% (the reduction ratio being measured by absorbance at a wavelength of 400 m$\mu$). As to the digestion rate, a 30–50% improvement is shown by a measurement of digestion with pepsin as compared with that before treatment.

Accordingly, the present invention is an entirely useful method which not only has advantages with respect to bleaching effect and an improvement in digestion rate, as mentioned above, but also has the further advantage that the nitrogen content in the protein extracted is unchanged by the treatment with hydrogen peroxide (the nitrogen content in the protein extracted being measured by the Kjeldahl method).

The following examples are given merely as illustrative of the present invention and are not to be considered as limiting. Thus, many applicable examples within the scope of the present invention can be successfully conducted.

Example 1

Corynebacterium glutamicum is cultured in a molasses medium and centrifuged. Then, 1N hydrochloric acid in an amount of from 5- to 10-fold (weight) of the volume of the living cells is added thereto, and the suspension is preheated at 100° C. for 5–10 minutes. A 1/10–1/2 N caustic soda solution in an amount of 10-fold (volume per weight) based on the cells, which has been preheated, is added thereto, and the resultant mixture is stirred at 25°–50° C. for 2–3 hours. Then, protein is extracted from the cells. The residue is removed by centrifugation to obtain an extracted solution.

The pH of the thus obtained extracted solution is adjusted with acid or alkali (as indicated in Table 1), and hydrogen peroxide is added thereto. The solution is allowed to stand at room temperature for 1.5 hours, and the reduction ratio of coloring thereof is measured. The values are shown in Table 1.

TABLE 1

| Concentration of $H_2O_2$, percent | Reduction ratio of coloring (percent) | | | | | |
|---|---|---|---|---|---|---|
| | pH3 | pH5 | pH7 | pH9 | pH11 | pH12 |
| 10 | 60.1 | 74.6 | 89.4 | 92.3 | 97.2 | 98.7 |
| 5 | 36.7 | 42.8 | 54.6 | 64.4 | 73.4 | 81.6 |
| 3 | 32.9 | 38.2 | 50.8 | 62.7 | 72.2 | 79.5 |
| 1 | 28.8 | 31.3 | 35.5 | 44.4 | 63.5 | 71.3 |
| 0.1 | 15.3 | 21.6 | 32.1 | 39.3 | 47.5 | 56.6 |

Results of a digestion test are shown in FIG. 1. In the Figure, the lower curve of circles shows a nontreated group carried out as a control, while the upper curve of solid circles shows a hydrogen peroxide-treated group. The digestion test is carried out by using 500 mg. of extracted protein, which has been treated with hydrogen peroxide in a concentration of 5% at pH 9, and 5 mg. of pepsin, reacting at pH 1.8 and maintaining the temperature at 38° C. for 24 hours. An improvement in digestion rate is clearly attained as compared with the nontreated group.

The relationship between the time of treatment with hydrogen peroxide and the nitrogen content in the extracted protein is shown in Table 2.

TABLE 2.—TIME OF TREATMENT WITH HYDROGEN PEROXIDE AND NITROGEN CONTENT IN THE EXTRACTED PROTEIN

| Time of treatment (hours) | 0 | 0.5 | 1.5 | 3.0 | 24 |
|---|---|---|---|---|---|
| Nitrogen content in the extracted protein (percent) | 12.4 | 12.1 | 12.6 | 12.4 | 12.7 |

The nitrogen content in the extracted protein is measured by the Kjeldahl method.

Example 2

100 g. of dry cells of Streptomyces griseus is suspended in 2 liters of water, and the pH is adjusted to 10. 18 ml. of hydrogen peroxide (30%) is added thereto dropwise with stirring while keeping the temperature at 30° C., and the addition is continued over a period of 30 minutes. After completion of the dropwise addition, the solution is allowed to stand for 30 minutes and coloring of the solution is compared with that before treatment with hydrogen peroxide. The results are shown in Table 3. The results of the digestion rate test are given in FIG. 2 (the solid circles on the upper curve again indicating the cells treated with hydrogen peroxide and the circles on the lower curve showing the results with nontreated cells as a control experiment). The digestion test is carried out in the same manner as in Example 1. The results shown both in Table 3 and in FIG. 2 clearly demonstrate the effective improvement obtained by means of the present invention.

Table 3

|  | Absorbance (400 mμ) | Absorbance (620 mμ) |
| --- | --- | --- |
| Control (suspension before treatment) | ∞ | 1.78 |
| Solution treated with hydrogen peroxide | 1.94 | 0.3 |

The invention being thus described, it will be obvious that the same may be varied in many ways. Such variations are not to be regarded as a departure from the spirit and scope of the invention, and all such modifications as would be obvious to one skilled in the art are intended to be included.

What is claimed is:

1. A method for treating micro-organism cells or protein extracted from cells which comprises forming a solution or suspension of said cells or said protein, adjusting the pH thereof to about 3 to 12, and adding hydrogen peroxide thereto to give a concentration thereof of about 0.1% to 10% by weight.

2. The method of claim 1, wherein said cells are obtained from micro-organisms belonging to *Corynebacterium*.

3. The method of claim 1, wherein said cells are obtained from micro-organisms belonging to *Streptomyces*.

4. The method of claim 1, wherein the temperature of the solution or suspension is maintained at from 0° to 100°C.

5. A method for treating micro-organism cells which comprises forming an aqueous solution or suspension of said cells, adjusting the pH thereof to about 3 to 12, and adding hydrogen peroxide thereto to give a concentration thereof of about 0.1% to 10% by weight.

6. The method of claim 5, wherein the temperature of the solution or suspension is maintained at from 0° to 100°C.

7. The method of claim 6, wherein the pH is adjusted to about 5 to 11.

8. The method of claim 7, wherein the concentration of hydrogen peroxide is about 1% to 10% by weight.

9. The method of claim 8, wherein the temperature of the solution or suspension is maintained at from 5° to 30°C.

10. The method of claim 9, wherein said cells are obtained from micro-organisms belonging to *Corynebacterium*.

11. The method of claim 9, wherein said cells are obtained from micro-organisms belonging to *Streptomyces*.

12. A method for treating protein extracted from micro-organism cells which comprises forming an aqueous solution or suspension of said protein, adjusting the pH thereof to about 3 to 12, and adding hydrogen peroxide thereto to give a concentration thereof of about 0.1% to 10% by weight.

13. The method of claim 12, wherein the temperature of the solution or suspension is maintained at from 0° to 100°C.

14. The method of claim 13, wherein the pH is adjusted to about 5 to 11.

15. The method of claim 14, wherein the concentration of hydrogen peroxide is about 1% to 10% by weight.

16. The method of claim 15, wherein the temperature of the solution or suspension is maintained at from 5° to 30°C.

17. The method of claim 16, wherein said cells are obtained from micro-organisms belonging to *Corynebacterium*.

18. The method of claim 16, wherein said cells are obtained from micro-organisms belonging to *Streptomyces*.